US012580203B2

(12) United States Patent 
Ishiyama et al.

(10) Patent No.: US 12,580,203 B2 
(45) Date of Patent: Mar. 17, 2026

(54) ELECTRODE HAVING COLUMNAR STRUCTURE PROVIDED WITH MULTILAYER PART

(71) Applicant: National Institute of Advanced Industrial Science and Technology, Tokyo (JP)

(72) Inventors: Tomohiro Ishiyama, Tsukuba (JP); Develos Katherine Bagarinao, Tsukuba (JP); Haruo Kishimoto, Tsukuba (JP); Katsuhiko Yamaji, Tsukuba (JP)

(73) Assignee: NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 934 days.

(21) Appl. No.: 17/628,637

(22) PCT Filed: Jul. 15, 2020

(86) PCT No.: PCT/JP2020/027490 
§ 371 (c)(1), 
(2) Date: Jan. 20, 2022

(87) PCT Pub. No.: WO2021/015068 
PCT Pub. Date: Jan. 28, 2021

(65) Prior Publication Data 
US 2022/0320527 A1 Oct. 6, 2022

(30) Foreign Application Priority Data 
Jul. 24, 2019 (JP) ................................ 2019-136008

(51) Int. Cl. 
*H01M 4/90* (2006.01) 
*H01M 4/88* (2006.01) 
(Continued)

(52) U.S. Cl. 
CPC ....... *H01M 4/9033* (2013.01); *H01M 4/8867* (2013.01); *H01M 4/905* (2013.01); *H01M 8/1213* (2013.01); *H01M 2008/1293* (2013.01)

(58) Field of Classification Search 
CPC ........ H01M 4/88; H01M 4/8867; H01M 4/90; H01M 4/9033; H01M 4/905; H01M 8/1213; H01M 2008/1293 
(Continued)

(56) References Cited

U.S. PATENT DOCUMENTS

2012/0251917 A1 10/2012 Son et al. 
2014/0141358 A1 5/2014 Son et al. 
(Continued)

FOREIGN PATENT DOCUMENTS

CN 104756309 A * 7/2015 .............. H01M 4/06 
JP H02-140648 A 5/1990 
(Continued)

OTHER PUBLICATIONS

Machine translation of CN 104756309 A (Year: 2015).*

(Continued)

*Primary Examiner* — Kevin P Kerns 
(74) *Attorney, Agent, or Firm* — Troutman Pepper Locke LLP; James E. Armstrong, IV; Nicholas J. DiCeglie, Jr.

(57) ABSTRACT

The invention provides an electrode component containing a columnar structure; and a porous collector layer that is prepared on the electrode component. The columnar structure includes multiple columnar sections, the lateral surfaces of which are at least partially in contact with each other. Each columnar part section is provided with a multilayer part wherein different inorganic compound layers are stacked. In addition, the columnar structure includes two or more adjacent columnar sections, which are different from each other in the stacking direction of the multilayer part.

(Continued)

COMPOSITE STRUCTURE 
COLUMNAR STRUCTURE 
POLYCRYSTALLINE BASE MATERIAL 
MULTILAYER PART 
COLUMNAR SECTION

For example, each columnar section has a width of 10 nm to 100 nm, and each inorganic compound layer has a thickness of 1 nm to 10 nm.

8 Claims, 5 Drawing Sheets

(51) Int. Cl.
*H01M 8/1213*        (2016.01)
*H01M 8/12*          (2016.01)

(58) Field of Classification Search
USPC ........................................................ 429/465
See application file for complete search history.

(56)                    References Cited

U.S. PATENT DOCUMENTS

2015/0295291 A1* 10/2015 Sata et al. ............... H01M 4/06
                                                      429/405
2017/0297117 A1   10/2017 Tatsuoka et al.

FOREIGN PATENT DOCUMENTS

| | | |
|---|---|---|
| JP | H05-024996 A | 2/1993 |
| JP | 2005-302424 A | 10/2005 |
| JP | 2012-221946 A | 11/2012 |
| JP | 2013-051101 A | 3/2013 |
| JP | 2016-064485 A | 4/2016 |

OTHER PUBLICATIONS

Myung Doo-Hwan et al: "Pulsed Laser Deposition of La0.6Sr0.4CoO3-[delta]-Ce0.9Gd0.1O2-[delta] Nano-Composite and Its Application to Gradient-Structured Thin-film Cathode of SOFC", Journal of the Electrochemical Society, vol. 158, No. 8, Jun. 14, 2011, pp. B1000-B1006. (cited in the Sep. 2, 2022 Search Report issued in the EP20843917.4).

Park Jung-Hoon et al: "Physical and Electrochemical Characteristics of Pulsed Laser Deposited La0.6Sr0.4CoO3-[delta]-Ce0.9Gd0.1O 2-[delta] Nanocomposites as a Function of the Mixing Ratio", Journal of the Electrochemical Society, vol. 161, No. 1, Oct. 30, 2013, pp. F16-F22. (cited in the Sep. 2, 2022 Search Report issued in the EP20843917.4).

* cited by examiner

COMPOSITE STRUCTURE

COLUMNAR
STRUCTURE

POLYCRYSTALLINE          MULTILAYER          COLUMNAR
BASE MATERIAL            PART                SECTION

BOUNDARY

COMPOSITE STRUCTURE

COLUMNAR STRUCTURE

HAADF

POLYCRYSTALLINE BASE MATERIAL

20~30nm

500nm

CURRENT
COLLECTOR
LAYER

LSCF NANO CURRENT
COLLECTOR LAYER

COLUMNAR
STRUCTURE

LSCF-GDC

200nm

ELECTRODE HAVING COLUMNAR STRUCTURE PROVIDED WITH MULTILAYER PART

TECHNICAL FIELD

The present application relates to an electrode, used for a solid oxide fuel cell (hereinafter sometimes referred to as an "SOFC"), a solid oxide electrolysis cell (hereinafter sometimes referred to as an "SOEC"), as well as storage batteries and the like, its columnar structure composing the electrode, and whose columnar structure comprises a composite structure.

BACKGROUND ART

As a high-performance electrode used for a solid oxide fuel cell, a nanocomposite electrode produced by a pulsed laser deposition (hereinafter sometimes referred to as "PLD") method has been known (Patent Document 1). By annealing after film deposition, this nanocomposite electrode improves the electrical conductivity, mechanical strength, and performance durability thereof. However, after the nanocomposite electrode has been used for about 10 hours in the SOFC, the performance, such as its catalytic activity, rapidly degrades.

In an electrode catalyst made of metal oxide, increasing its surface area and increasing the interfaces between dissimilar materials is effective in increasing its catalytic activity. However, in a case in which the electrode comprises granulated nanoparticles in order to increase its electrode surface area, performance degradation due to a structural change, such as that resulting from sintering, becomes a problem due to the influence of an increase in surface energy. For improvement of the performance of the SOFC and the SOEC, resistance reduction by reducing the thickness of the entire cell is effective. However, a decrease in the mechanical strength due to thinning of the cell becomes a problem. An electrode catalyst material having high catalytic activity and mechanical strength and sustaining performance for a long period has been demanded not only for the SOFC and the SOEC but also for storage batteries, etc.

Patent Document 1: U.S. Published Patent Application Publication, No. 2014/0141358, Specification

DISCLOSURE OF THE INVENTION

Problems to be Solved by the Invention

The object of the present application is to provide an electrode, which comprises a composite structure, capable of sustaining performance for a long period, having high catalytic activity and mechanical strength, and being suitable for use for, e.g., an SOFC.

Means for Solving the Problems

For the purpose of producing a high-performance electrode material, the inventors of the present application have conducted intensive study on the method for simultaneously forming different metal oxide layers on a polycrystalline base material by the PLD method. As a result, a composite structure including a columnar structure could be produced. Moreover, it has been found that an electrode including an electrode component having a columnar structure and a porous current collector layer prepared on it has high catalytic activity and mechanical strength and sustains performance for a long period of time. The present application is based on such findings.

The columnar structure of the present application is a structure including multiple columnar sections with lateral surfaces which are at least partially in contact with each other, each columnar section including a multilayer part in which different inorganic compound layers are stacked on each other. The composite structure of the present application includes a polycrystalline base material and the columnar structure of the present application prepared on the polycrystalline base material. The electrode of the present application includes an electrode component having the columnar structure of the present application and a porous current collector layer prepared on it. The method for fabricating the composite structure of the present application includes the step of simultaneously forming the different metal oxide layers on the polycrystalline base material by pulsed laser deposition method.

Effects of the Invention

According to the present application, the electrode having high catalytic activity and mechanical strength and sustaining performance for a long period, the columnar structure forming the electrode, and the columnar structure with composite structure are obtained.

PREFERRED MODE FOR CARRYING OUT THE INVENTION

Figure 1:
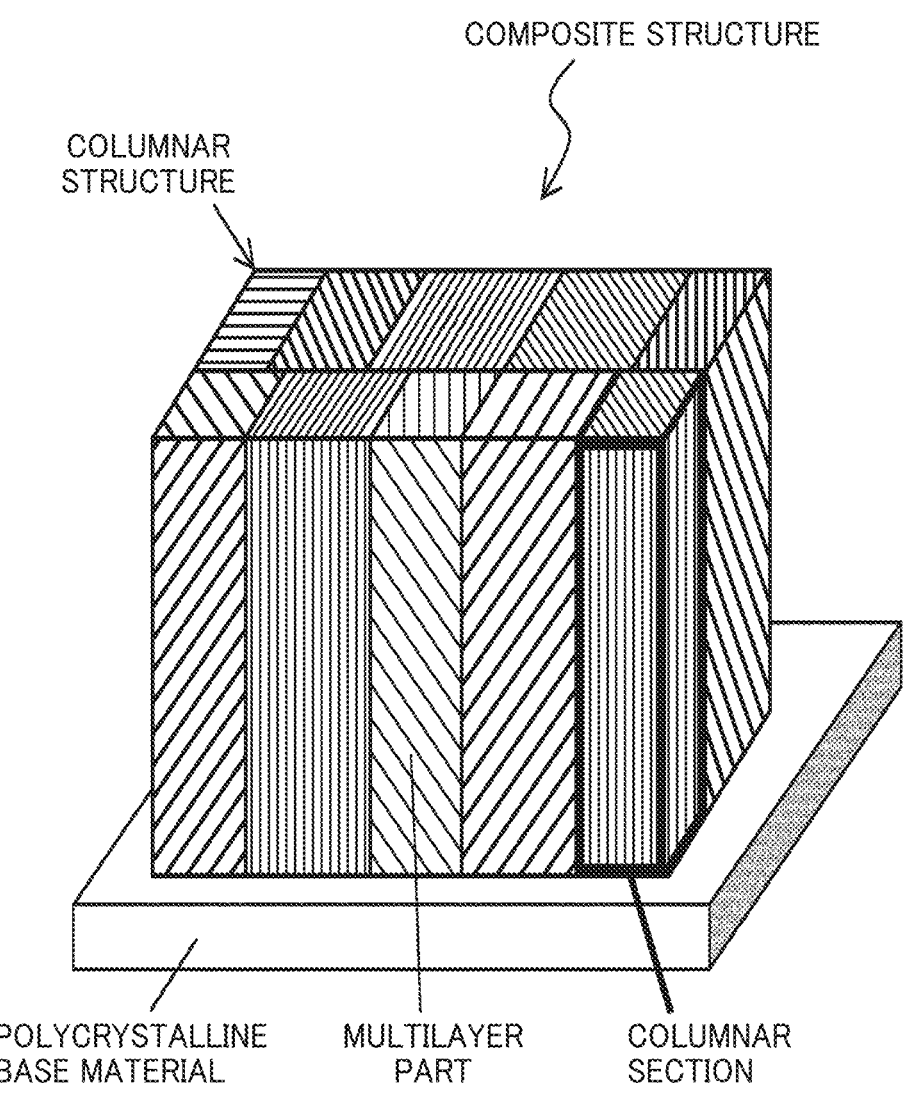
FIG. 1 shows a schematic perspective view of a composite structure of the embodiment.

FIG. 1 schematically shows a composite structure of an embodiment of the present application. Unless otherwise provided, an upper-lower direction is, in the present application, defined with reference to the orientation of the composite structure shown in FIG. 1. Thus, e.g., a height direction of a columnar section is coincident with the upper-lower direction. The composite structure of the present embodiment includes a polycrystalline base material and a columnar structure of the embodiment of the present application provided on the polycrystalline base material. The columnar structure of the present embodiment includes multiple columnar sections with lateral surfaces which are at least partially in contact with each other. These columnar sections preferably should be in contact with each other over their entire lateral surfaces.

The columnar section includes a multilayer part in which different inorganic compound layers are stacked on each other. The inorganic compound layers are preferably one or more types of layers including a metal oxide layer, a metal nitride layer, and a metal carbide layer. Since metal oxide is used for, e.g., an electrode of an SOFC, a case where the inorganic compound layer is the metal oxide layer will be hereinafter described as an example.

The columnar structure of the present embodiment includes the multilayer parts in which different metal oxide layers are stacked on each other and has a large area of dissimilar material interfaces. Normally, in a case where two types of metal oxides form the electrode of the SOFC, an oxide ion conductor is used for one metal oxide, and an electron conductor or a mixed electron-oxide ion conductor is used for the other metal oxide. It is known that electrode activity is high at such dissimilar metal oxide interfaces. The same also applies not only to metal oxide, but also to other inorganic compounds. Thus, in a case where the columnar structure of the present embodiment is used as an electrode catalyst for, e.g., the SOFC, dissimilar material interfaces are present in high densities, and therefore, catalytic activity is high.

An electrode of the present embodiment includes an electrode component having the columnar structure of the present embodiment and a porous current collector layer provided on the electrode component. The current collector layer preferably includes multiple columnar bodies prepared on some columnar sections of the columnar structure and voids formed in-between the columnar bodies. Corresponding to the current collector layer having this structure, an effective electron supply to the electrode component can be achieved, and diffusion of oxygen or fuel essential to electrode reaction is not inhibited.

The interfaces between the dissimilar metal oxide layers exhibit a low mechanical strength along their planar direction, i.e., a low mechanical strength at the interface between the stacked layers. Thus, if the direction of such an interface is different between adjacent ones of the columnar sections, the direction in which the mechanical strength is low varies according to the columnar sections. In the columnar structure of the present embodiment, one columnar section compensates for the low mechanical strength of the other columnar section, and accordingly, the mechanical strength of the columnar structure increases. Thus, even if a thin columnar structure with reduced electrical resistance is used as an electrode catalyst for improving the performance of, e.g., the SOFC the necessary mechanical strength is obtained.

Note that in a case where an electrode catalyst having small metal oxide particles of the same type and having a large surface area is used for, e.g., the SOFC, the surface energy, i.e., the surface area, of the electrode catalyst decreases, and therefore, the metal oxide particles are easily sintered. When the metal oxide particles are sintered, the surface area further decreases, and therefore, the performance of the electrode catalyst is degraded. However, the columnar structure of the present embodiment includes the columnar sections, each of which is configured such that different metal oxide layers are stacked on each other. Moreover, in the columnar structure of the present embodiment, a layer stacking direction is different between adjacent ones of the columnar sections. That is, the columnar structure of the present embodiment includes two or more adjacent columnar sections different from each other in the layer stacking direction.

The columnar structure of the present embodiment includes the columnar sections, each of which is configured such that the different metal oxide layers are stacked on each other. Moreover, the layer stacking direction is different between adjacent ones of the columnar sections. Thus, mass transfer at the contact interface between the columnar sections is inhibited, and the regions where the metal oxide particles of the same type exist together is small. Thus, even if the columnar structure of the present embodiment is used as the electrode catalyst of, e.g., the SOFC, sintering of the metal oxide is reduced. That is, if the columnar structure of the present embodiment is used as the electrode catalyst, the performance of the catalyst is sustained for a long period.

For improvement of the electrode catalytic activity and improvement of the material strength, the width of the columnar section is preferably 10 nm to 100 nm, and the thickness of the metal oxide layer is preferably 1 nm to 10 nm. This is because the substance forming each metal oxide layer retains such a size that it exhibits its physical properties as a crystal (substance) while a sufficient multilayer structure is formed in the columnar structure. Furthermore, this is because adjacent parts of the columnar sections, which contribute to relieving stress and catalytic activity improvement, can be sufficiently formed.

In the columnar structure of the present embodiment, the layer stacking direction of the multilayer part is different from the height direction of the columnar section. That is, the planar direction of the multilayer part and the height direction of the columnar section are not perpendicular to each other. Thus, when fuel or oxygen moves along the height direction of the columnar sections, inhibition of the movement of fuel or oxygen by layer interfaces in the multilayer structure is limited. Assuming that the planar direction of the multilayer part and the height direction of the columnar section is defined as 90° when the planar direction of the multilayer part and the height direction of the columnar section are orthogonal, the angle between the planar direction of the multilayer part and the height direction of the columnar section should preferably be between 5° and 85°.

The multilayer part may include two types of metal oxide layers as in the columnar structure of the present embodiment, or may include three or more different types of metal oxide layers as stacked layers. One of two or more types of metal oxide layers is preferably a $(Ce,Gd)O_2$ layer, a $(La,Sr)CoO_3$ layer, or a $(La,Sr)(Co,Fe)O_3$ layer. Note that $(Ce,Gd)O_2$ indicates a compound in which part of Ce of $CeO_2$ is substituted with Gd, $(La,Sr)CoO_3$ indicates a compound in which part of La of $LaCoO_3$ is substituted with Sr, and $(La,Sr)(Co,Fe)O_3$ indicates a compound in which part of La of $LaCoO_3$ is substituted with Sr and part of Co of $LaCoO_3$ is substituted with Fe.

For example, in a case where the multilayer part includes two types of metal oxide layers as in the columnar structure of the present embodiment, one metal oxide layer is the $(Ce,Gd)O_2$ layer, and the other metal oxide layer is the $(La,Sr)CoO_3$ layer or the $(La,Sr)(Co,Fe)O_3$ layer. It is assumed that the columnar structure of the present embodiment can be used not only for the electrode catalyst but also for, e.g., a catalyst for chemical synthesis.

The columnar structure of the present embodiment including the multilayer parts, each of which is configured such that the different metal oxide layers are stacked on each other, and configured such that at least a part of the lateral surfaces of the columnar sections are in contact with each other is obtained in such a manner that the films of the different types of metal oxides are simultaneously formed on the polycrystalline base material by a PLD method. That is, the method for fabricating the composite structure of the embodiment of the present application has the step of simultaneously forming the different metal oxide layers on the polycrystalline base material by the pulsed laser deposition method.

EXAMPLES

Example 1

Using a PLD apparatus (PVD Products Inc., NanoPLD), films of $(Ce,Gd)O_2$ (hereinafter "$(Ce,Gd)O_2$," will be sometimes referred to as "GDC") and $(La,Sr)(Co,Fe)O_3$ (hereinafter, "$(La,Sr)(Co,Fe)O_3$," will be sometimes referred to as "LSCF") were simultaneously formed on a polycrystalline $(Ce,Gd)O_2$ substrate. In this manner, a composite structure was produced. Note that the films were formed under such conditions in which an oxygen partial pressure is 35 mTorr, a substrate temperature is 750° C., film deposition time is 100 minutes, a distance between a target and the substrate is 75 mm, a substrate rotation speed is 10 rpm, the incident angle of laser light (Coherent Inc., Compex Pro 102F, KrF, a wavelength of 248 nm) is 60°, a laser energy is 200 mJ, and a laser repetition rate is 10 Hz. HAADF-STEM images of the composite structure of the present example are shown in FIG. 2, and a surface SEM image is shown in FIG. 3.

Figure 2:
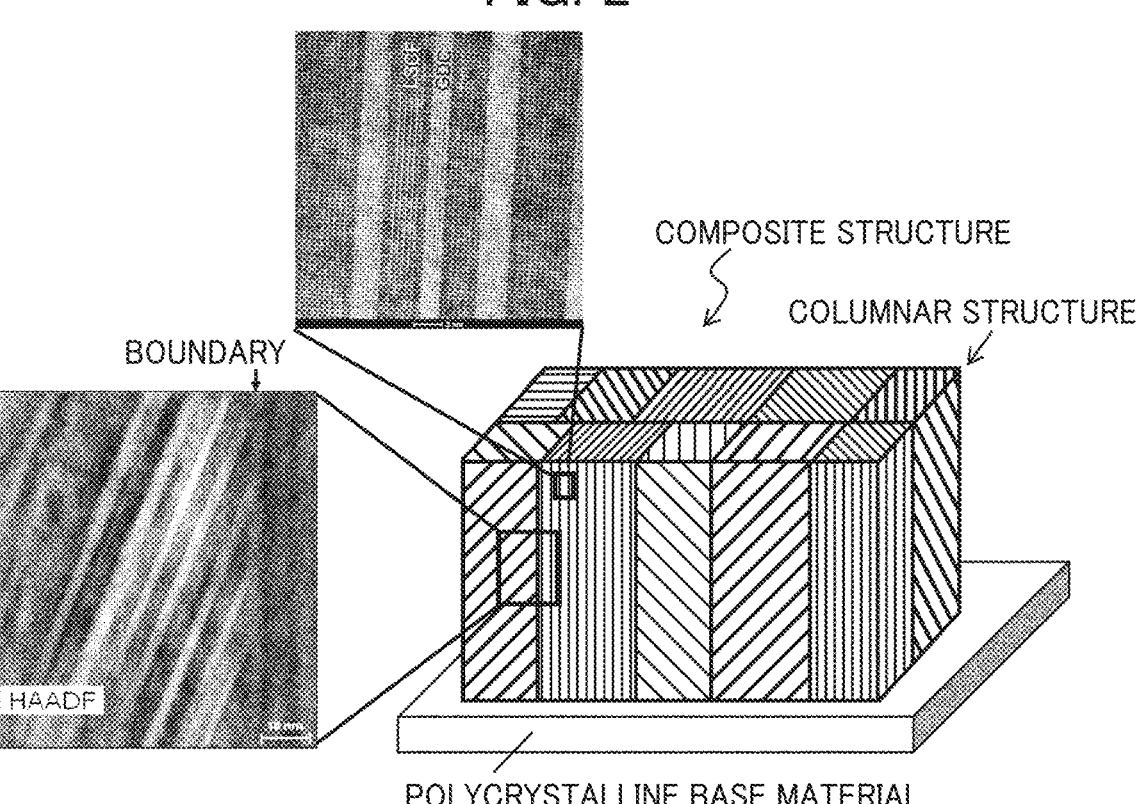
FIG. 2 shows a schematic perspective view of a composite structure of Example 1, a cross-sectional HAADF-STEM image for the rectangle at the upper part of the schematic perspective view, and an HAADF-STEM image for the rectangle at the lower part of the schematic perspective view.
Figure 3:
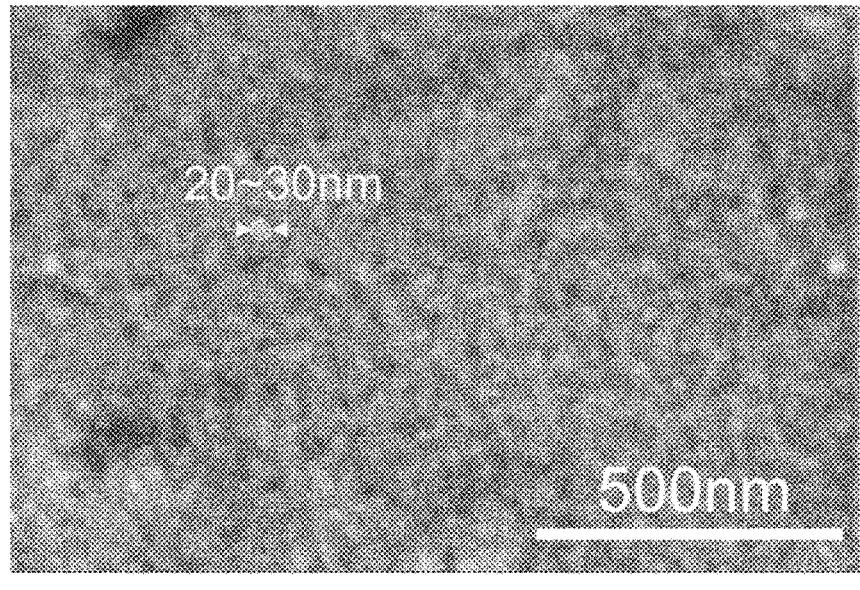
FIG. 3 shows a surface SEM image of the composite structure of Example 1.

FIG. 2 shows the cross-sectional HAADF-STEM image (a scale bar is 2 nm) for the rectangle at the upper part of the schematic perspective view of the composite structure and the HAADF-STEM image (a scale bar is 10 nm) for the rectangle at the lower part of the schematic perspective view. As shown in the sectional HAADF-STEM image of FIG. 2, a columnar section comprises a multilayer part in which GDC layers and LSCF layers with thicknesses of 1 nm to 5 nm are alternately stacked on each other. Moreover, as shown in the HAADF-STEM image of FIG. 2, in a columnar structure, lateral surfaces of the columnar sections are in contact with each other, and the layer stacking direction of the multilayer parts is different among these columnar sections. It is assumed that the lateral surfaces of the columnar sections are in contact with each other, the layer stacking direction of the multilayer part is different among the columnar sections, and the GDC layers the LSCF layers are alternately stacked on each other in the multilayer part resulting from the use of the polycrystalline GDC substrate. That is, in the PLD method, the deposited film is easily grown epitaxially along the orientation matching that of the substrate material.

In the present example, the films of the different types of metal oxides were simultaneously formed on the polycrystalline substrate by the PLD method. Accordingly, the different metal oxide layers simultaneously nucleated in a several-nm region and were epitaxially grown, thereby forming the columnar section. In addition, the crystal orientation of the substrate material is not constant. Thus, the growth direction was different for each metal oxide particle, resulting in a stripe-like multilayer structure with different inclinations in adjacent columnar sections. FIG. 3 shows that the composite structure of the present example includes the columnar structure having the columnar sections contacting each other at the lateral surfaces. The width of the columnar section was 20 nm to 30 nm.

Figure 4:
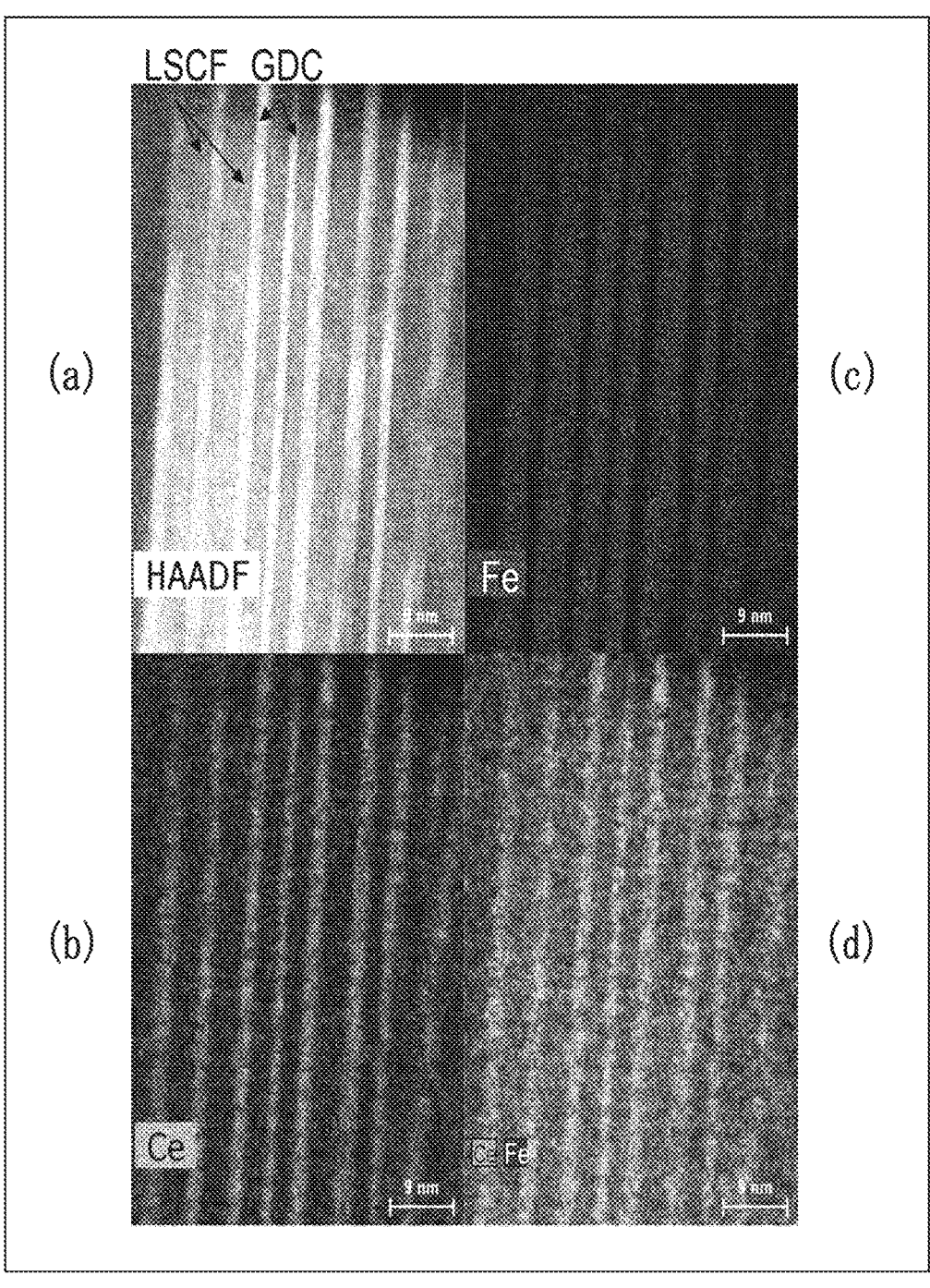
FIG. 4 shows images of the composite structure of Example 1, (a) HAADF-STEM image, (b) Ce mapping data, (c) Fe mapping data, and (d) overlay of the Ce mapping data and the Fe mapping data.

An HAADF-STEM image of this composite structure is shown in (a) of FIG. 4. Ce mapping data measured in the same field of view as that of (a) of FIG. 4 is shown in (b) of FIG. 4. Fe mapping data measured in the same field of view as that of (a) of FIG. 4 is shown in (c) of FIG. 4. Data showing the overlay of the mapping data of (b) of FIG. 4 and the mapping data of (c) of FIG. 4 is shown in (d) of FIG. 4. As shown in (a) to (d) of FIG. 4, the columnar section of the composite structure of the present example included the multilayer part in which the layers containing Ce and the layers containing Fe are alternately stacked on each other.

Example 2

As in Example 1, films of GDC and LSCF were simultaneously formed on a polycrystalline $(Ce,Gd)O_2$ substrate, and a columnar structure was produced on the substrate. Under such conditions in which an oxygen partial pressure is 100 mTorr, film deposition time is 90 minutes, a laser energy is 275 mJ, and a laser repetition rate is 20 Hz, a current collector layer of a porous layer of LSCF was, without heating the substrate, formed on the columnar structure by a PLD method, and an electrode was fabricated on a polycrystalline GDC substrate. A cross-sectional SEM image of the electrode of the present example is shown in FIG. 5.

Figure 5:
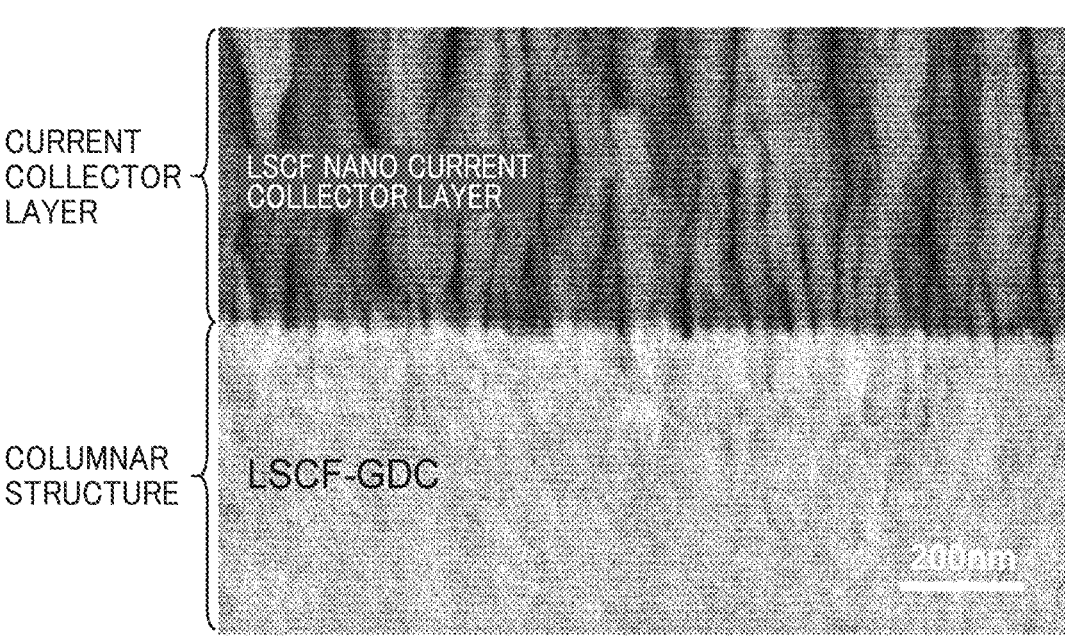
FIG. 5 shows a cross-sectional SEM image of an electrode component of Example 2.

As shown in FIG. 5, the electrode was obtained, which includes the columnar structure (in the figure, "LSCF-GDC") made of LSCF and GDC and the LSCF nano current collector layer formed on the columnar structure and having nanosized columnar particles of LSCF. As shown in FIG. 5, the columnar structure of the present example was configured such that columnar sections with a width of 20 nm to 30 nm and a height of about 400 nm are densely formed. Moreover, the current collector layer of the present example included multiple columnar bodies with a width of 20 nm to 30 nm. These columnar bodies were prepared on some columnar sections of the columnar structure. Voids were formed in-between these columnar bodies. For efficiently utilizing the nanosized columnar structure as an electrode catalyst, as shown in this example, an electrode wherein the current collector layer has voids for gas diffusion and with columnar bodies having nanosized particles connected to the columnar structure and capable of uniform current collection across the entirety of the electrode is preferable.

Example 3

As in Example 1, films of GDC and $(La,Sr)CoO_3$ (hereinafter "$(La,Sr)CoO_3$" will be sometimes referred to as "LSC") were simultaneously formed on a polycrystalline GDC substrate, and a columnar structure was produced on the substrate. Under such conditions in which an oxygen partial pressure is 100 mTorr, film deposition time is 45 minutes, a laser energy is 275 mJ, and a laser repetition rate is 20 Hz, a current collector layer of a porous layer of LSC was, without heating the substrate, formed on the columnar structure by a PLD method, and an electrode component was manufactured. Similarly, a columnar structure and a current collector layer were also formed on the back surface of the substrate, forming a symmetric cell for electrode performance test.

Using the cell of Example 3, the electrode reaction resistance (ASR) of the electrode and the ohmic resistance of the cell were calculated by the following method. First, LSC paste was applied to the current collector layer of the cell of Example 3, and a metal mesh was pressed against such paste. Next, using an electrochemical measurement apparatus (Princeton Applied Research, VersaSTAT4) including a frequency response analyzer (FRA), the impedance spectrum of the cell was measured in every predetermined time under such conditions in which a swept frequency range is 1 MHz to 0.1 Hz and an applied voltage amplitude is 10 mV.

From the obtained spectrum, the reaction resistance component and ohmic resistance component of the cell were calculated. A value obtained in such a manner in which the half value of the reaction resistance component is multiplied by the surface area of the current collector layer was taken as the ASR of the electrode component. The intersection of the obtained spectrum with the real axis of a high-frequency resistance component in a Nyquist plot was read as the ohmic resistance (R). From the thickness (L) of the polycrystalline substrate and the surface area (S) of the current collector layer, an electrical conductivity ($\sigma$) was calculated according to $\sigma = L/R \cdot S$.

Figure 6:
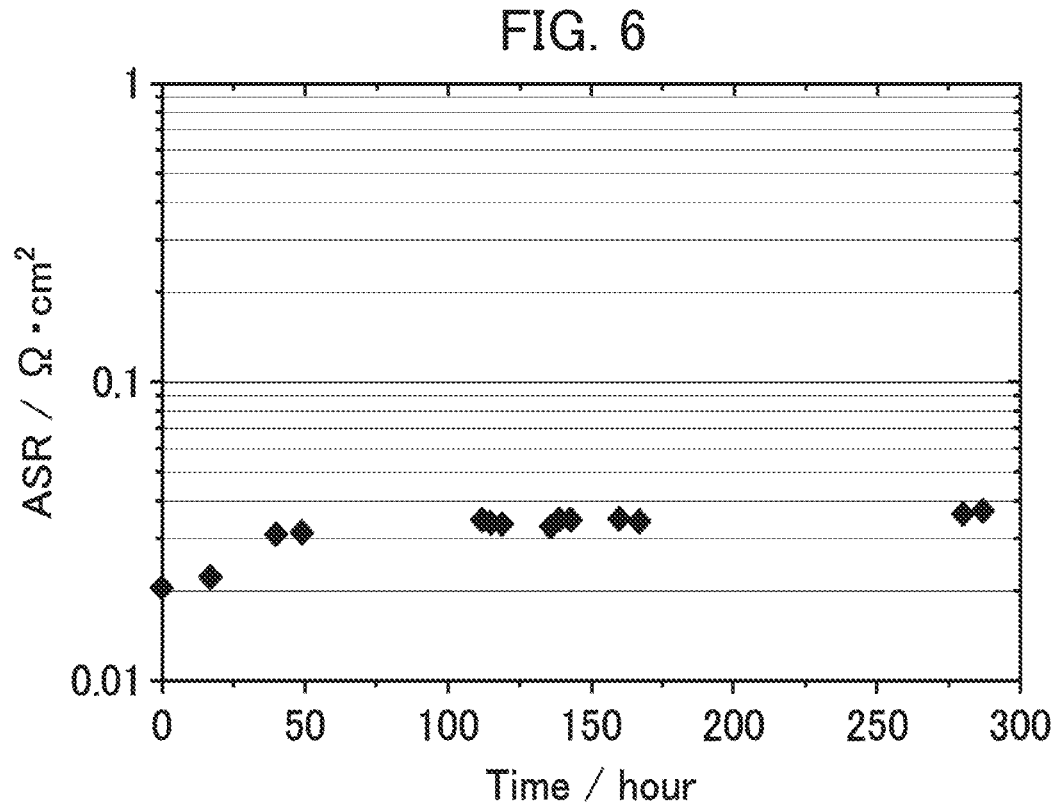
FIG. 6 shows a graph of a change in the electrode reaction resistance component of a cell of Example 3 over time.
Figure 7:
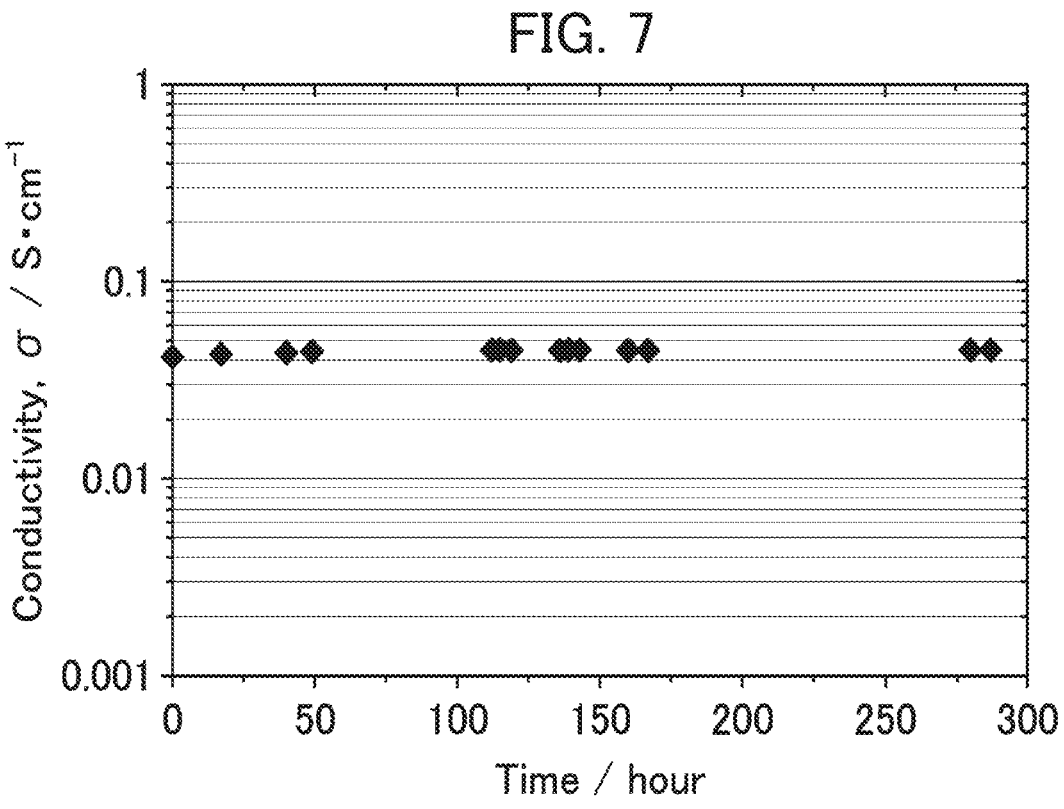
FIG. 7 shows a graph of a change in the electrical conductivity of the cell of Example 3 over time.
Figure 8:
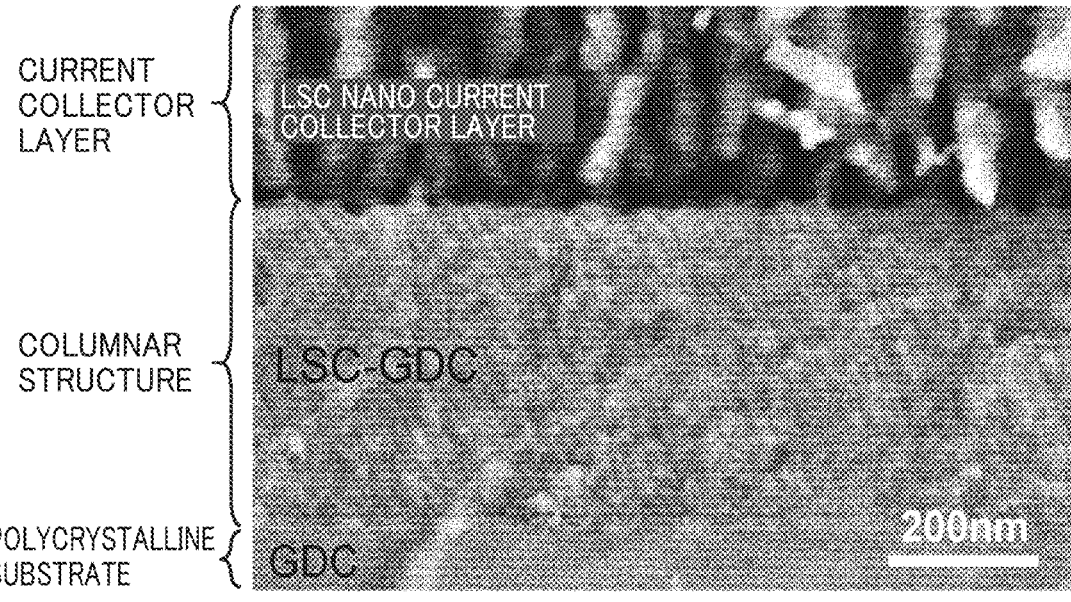
FIG. 8 shows a cross-sectional SEM image after the cell of Example 3 has been held for 270 hours at 700° C.

FIG. 6 shows a change in the electrode reaction resistance component of the cell of the present example over time. As shown in FIG. 6, the initial ASR of the cell of the present example was a small value of about 0.021 $\Omega \cdot cm^2$. The electrode reaction resistance of the cell after a lapse of 50 hours was about 0.037 $\Omega \cdot cm^2$, which increased to about 1.5 times as high as the initial value. However, the electrode reaction resistance was stable thereafter, and was maintained low until after a lapse of about 270 hours. FIG. 7 shows a change in a of the cell of the present example over time. As shown in FIG. 7, $\sigma$, i.e., the ohmic resistance component, of the cell of the present example did not change. FIG. 8 is a cross-sectional SEM image of the cell of the present example which had been held in air for 270 hours at 700° C. As shown in FIG. 8, the cell structure having been held as described above showed little change from its cell structure before being held.

According to the present example, no great change in the electrode component structure, the electrode reaction resistance, and the ohmic resistance component was shown. As described above, the electrode of the present application includes the dense multilayer structure of the different types of metal oxides, and therefore, the catalytic activity is improved. Moreover, the electrode of the present application includes the dense multilayer structure of the different types of metal oxides, and therefore, the area of direct contact among the nanosized metal oxide particles of the same type can be decreased and sintering upon use for, e.g., the SOFC can be reduced. By suppressing sintering, the electrode of the present application can extend the performance lifetime, i.e., its performance as catalyst can be sustained for a long period.

The invention claimed is:

1. A columnar structure of an electrode component comprising:

multiple columnar sections with lateral surfaces at least partially contacting each other, wherein each columnar section has a height direction and includes a multilayer part in which different inorganic compound layers are stacked on each other and arranged in a layer stacking direction of the multilayer part, and wherein the columnar sections include two or more adjacent columnar sections different from each other in spatial angles of the layer stacking direction of the multilayer part.

2. The columnar structure according to claim 1, wherein the inorganic compound layers are one or more types of layers including a metal oxide layer, a metal nitride layer, and a metal carbide layer.

3. The columnar structure according to claim 1, wherein a width of each columnar section is 10 nm to 100 nm.

4. The columnar structure according to claim 1, wherein a thickness of each inorganic compound layer is 1 nm to 10 nm.

5. The columnar structure according to claim 1, wherein a spatial angle of the layer stacking direction of the multilayer part is different from a spatial angle of the height direction of each columnar section.

6. The columnar structure according to claim 1, wherein the multilayer part includes two or more types of metal oxide layers, and wherein the multilayer part has three or more layers arranged in an alternating manner.

7. The columnar structure according to claim 6, wherein one of the two or more types of metal oxide layers is a $(Ce,Gd)O_2$ layer, a $(La,Sr)CoO_3$ layer, or a $(La,Sr)(Co,Fe)O_3$ layer.

8. The columnar structure according to claim 6, wherein one of two types of metal oxide layers among the two or more types of metal oxide layers is a $(Ce,Gd)O_2$ layer, and the other one of the two types of metal oxide layers among the two or more types of metal oxide layers is a $(La,Sr)CoO_3$ layer or a $(La,Sr)(Co,Fe)O_3$ layer.

* * * * *